US012621838B2

(12) United States Patent
Mu

(10) Patent No.: US 12,621,838 B2
(45) Date of Patent: May 5, 2026

(54) INFORMATION TRANSMISSION METHOD AND APPARATUS, AND COMMUNICATION DEVICE, AND STORAGE MEDIUM USING PDCCH INDICATION WITH RANDOM ACCESS PROCEDURE

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 416 days.

(21) Appl. No.: 18/002,556

(22) PCT Filed: Jun. 24, 2020

(86) PCT No.: PCT/CN2020/098273

§ 371 (c)(1),
(2) Date: Dec. 20, 2022

(87) PCT Pub. No.: WO2021/258375

PCT Pub. Date: Dec. 30, 2021

(65) Prior Publication Data

US 2023/0354346 A1 Nov. 2, 2023

(51) Int. Cl.
*H04W 4/00* (2018.01)
*H04L 5/00* (2006.01)
(Continued)

(52) U.S. Cl.
CPC .......... *H04W 72/23* (2023.01); *H04L 5/0053* (2013.01); *H04W 72/53* (2023.01); *H04W 74/0833* (2013.01)

(58) Field of Classification Search
CPC ... H04W 72/23; H04W 72/53; H04W 5/0053; H04W 74/0833
See application file for complete search history.

(56) References Cited

U.S. PATENT DOCUMENTS 10,945,248 B2 * 3/2021 Takeda .................. H04W 72/04
2015/0156760 A1 * 6/2015 Yu ..................... H04W 72/0446
370/329

(Continued)

FOREIGN PATENT DOCUMENTS

CN 103298128 A 9/2013
CN 110495192 A 11/2019
(Continued)

OTHER PUBLICATIONS

International Search Report and Written Opinion of International Application No. PCT/CN2020/098273, mailed Mar. 22, 2021, 12 pages.

(Continued)

*Primary Examiner* — Abdelnabi O Musa
(74) *Attorney, Agent, or Firm* — Finnegan, Henderson, Farabow, Garrett & Dunner, L.L.P.

(57) ABSTRACT

An information transmission method is applied to a base station, and includes: sending a physical downlink control channel (PDCCH) signaling corresponding to a type of a user equipment (UE) according to the type of the UE; wherein the PDCCH signaling carries random access response control information for the UE; wherein different types of UEs correspond to different PDCCH signalings, and the random access response control information is configured to indicate scheduling information associated with a random access response.

18 Claims, 5 Drawing Sheets

(51) Int. Cl.

| | | |
|---|---|---|
| *H04W 72/23* | (2023.01) | |
| *H04W 72/53* | (2023.01) | |
| *H04W 74/0833* | (2024.01) | |

(56) References Cited

U.S. PATENT DOCUMENTS

| | | | | |
|---|---|---|---|---|
| 2019/0007976 | A1 | 1/2019 | Lee et al. | |
| 2021/0250930 | A1* | 8/2021 | Sakhnini | H04L 5/0053 |
| 2021/0282042 | A1* | 9/2021 | Park | H04B 17/309 |
| 2022/0159733 | A1* | 5/2022 | Cirik | H04L 5/0092 |
| 2022/0225428 | A1* | 7/2022 | Xiong | H04W 72/23 |
| 2022/0240324 | A1* | 7/2022 | Ko | H04W 76/28 |
| 2022/0361122 | A1* | 11/2022 | Zheng | H04L 5/0082 |
| 2022/0394664 | A1* | 12/2022 | Xie | H04W 68/005 |
| 2023/0047726 | A1* | 2/2023 | Xu | H04W 72/20 |
| 2023/0122950 | A1* | 4/2023 | Wei | H04W 72/232 |
| | | | | 370/329 |
| 2023/0217498 | A1* | 7/2023 | Lee | H04W 74/0833 |
| | | | | 370/329 |
| 2023/0224911 | A1* | 7/2023 | Nam | H04L 5/0078 |
| | | | | 370/329 |
| 2024/0121800 | A1* | 4/2024 | Zhu | H04W 72/1263 |

FOREIGN PATENT DOCUMENTS

| | | |
|---|---|---|
| JP | 2015526962 A | 9/2015 |
| JP | 7520163 B2 | 7/2024 |

OTHER PUBLICATIONS

Examination report for Indian Application No. 202247077117, issued on Mar. 10, 2023, 5 pages.

Examination report for Chinese Application No. 202080001349.0, issued on Dec. 2, 2022, 15 pages.

European Patent Office, Extended European Search Report issued in Application No. 20941729.4, dated Jun. 21, 2023, 14 pages.

Apple Inc., "PDCCH Monitoring for Reduced Capability Devices", 3GPP TSG-RAN WG1 #101, R1-2004252, e-Meeting, May 25-Jun. 5, 2020, 3 pages.

3GPP TS 38.213 V15.9.0 (Mar. 2020), 3rd Generation Partnership Project; Technical Specification Group Radio Access Network; NR; Physical layer procedures for control (Release 15), 109 pages.

"Functionality for coverage recovery for Redcap", Ericsson, 3GPP TSG-RAN WG1 Meeting #101-e, R1-2003291, e-Meeting, May 25-Jun. 5, 2020, 13 pages.

"On PDCCH monitoring simplifications for RedCap NR UEs", Intel Corporation, 3GPP TSG RAN WG1 Meeting #101-E, R1-2003771, e-Meeting, May 25-Jun. 5, 2020, 4 pages.

European Search Report Issued in Application No. 20941729.4 dated Oct. 31, 2024, 9 pages.

Notice of Reasons for Refusal for Japanese Application No. 2022-580246, issued on Oct. 27, 2023, 13 pages.

LG Electronics Inc., "Discussion on increasing RAR window for eMTC", 3GPP TSG-RAN2 Meeting #97bis, R2-1703314, Spokane, Washington, Apr. 3-7, 2017, 4 pages.

Samsung "Considerations on access barring and UE capability", 3GPP TSG RAN WG1 #101 e-Meeting, R1-2003913, May 25-Jun. 5, 2020, 3 pages.

Office Action issued by the Korean Patent Office on Mar. 18, 2025, in corresponding Application No. KR 10-2022-7046501, 11 pages.

Notice of Reasons for Refusal issued by the Japanese Patent Office on Mar. 14, 2025, in corresponding Application No. JP 2024-086521, 10 pages.

"Discussion on functionality for coverage recovery" vivo, Guangdong Genius, 3GPP TSG-RAN WG1 Meeting #101, R1-2003433, e-Meeting, May 25-Jun. 5, 2020, 7 pages.

"Capability and complexity reduction for Reduced Capability NR devices" vivo, Guangdong Genius, 3GPP Tsg-Ran WG1 #1101, R1-2003431, e-Meeting, May 25-Jun. 5, 2020, 9 pages.

"Coverage recovery for low capability device", Samsung, 3GPP TSG RAN WG1 #101-e, R1-2003912, e-Meeting, May 25-Jun. 5, 2020, 7 pages.

Office Action issued by the Intellectual Property Office of Singapore on Nov. 1, 2025, in corresponding SG Application No. 11202261469T, 10 pages.

* cited by examiner

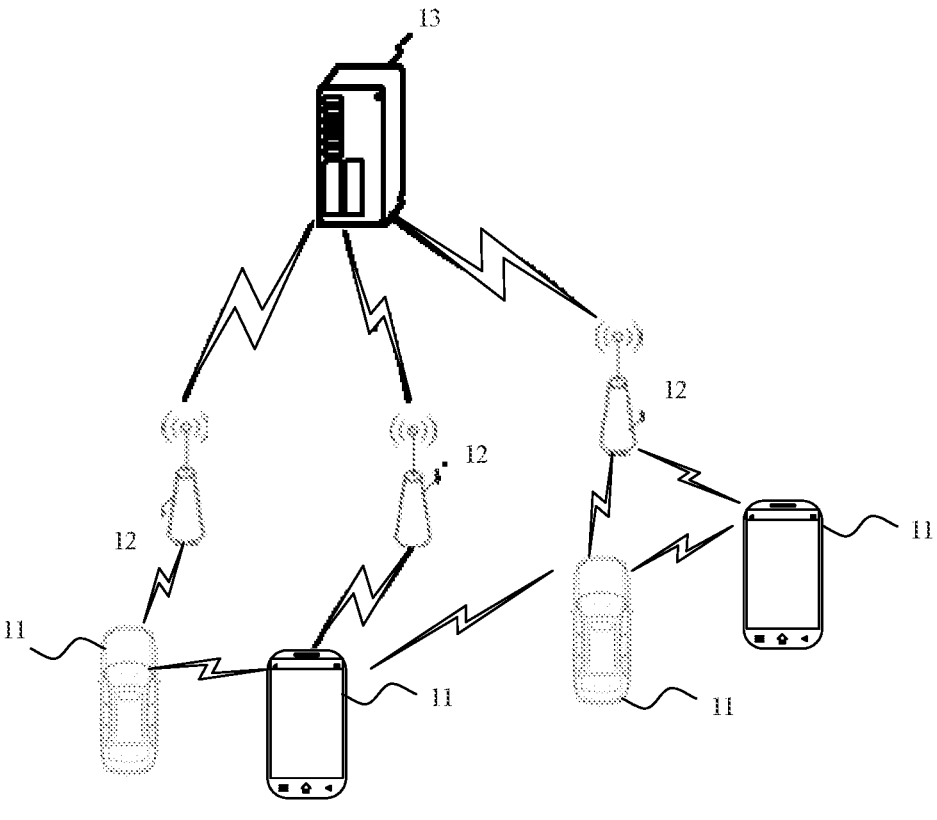

FIG. 1

| base station | | user equipment |
|---|---|---|

201: sending a PDCCH signaling corresponding to a type of a UE according to the type of the UE; in which the PDCCH signaling carries random access response control information for the UE; in which different types of UEs correspond to different PDCCH signalings, and the random access response control information is configured to indicate scheduling information associated with a random access response

FIG. 2

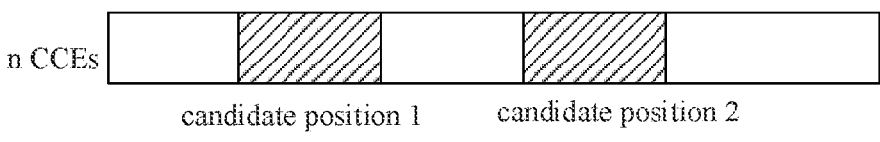

n CCEs candidate position 1    candidate position 2

FIG. 3

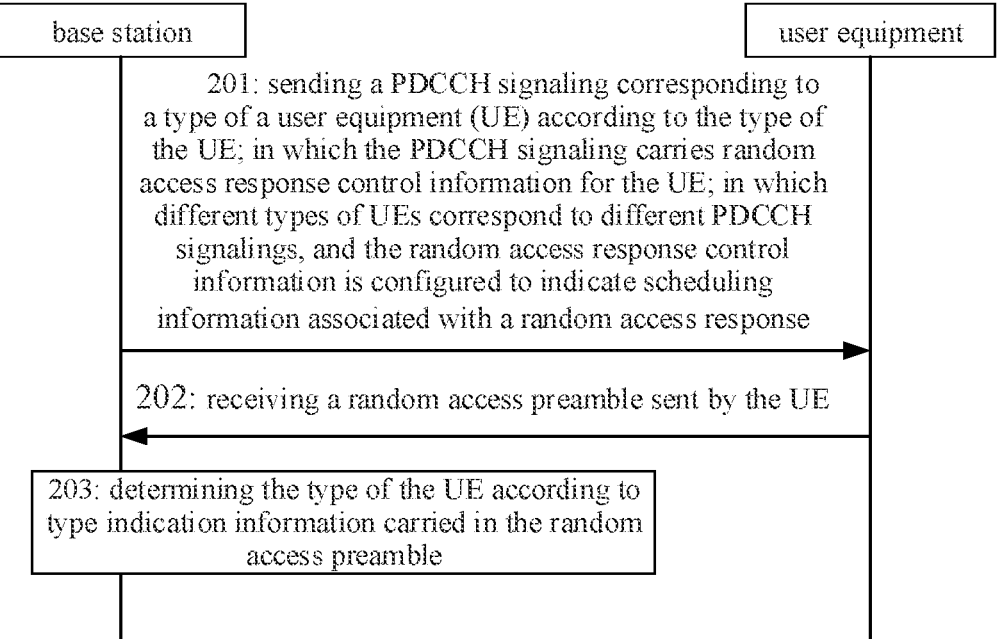

| base station | | user equipment |
| --- | --- | --- |

201: sending a PDCCH signaling corresponding to a type of a user equipment (UE) according to the type of the UE; in which the PDCCH signaling carries random access response control information for the UE; in which different types of UEs correspond to different PDCCH signalings, and the random access response control information is configured to indicate scheduling information associated with a random access response 202: receiving a random access preamble sent by the UE 203: determining the type of the UE according to type indication information carried in the random access preamble

FIG. 4

| base station | | user equipment |
| --- | --- | --- |

501: receiving a PDCCH signaling with receiving parameters corresponding to a type of the UE; in which the PDCCH signaling carries random access response control information of the UE; in which different types of UEs correspond to different PDCCH signalings, and the random access response control information is configured to indicate scheduling information associated with a random access response

FIG. 5

| base station | | user equipment |
|---|---|---|

501: receiving a PDCCH signaling with receiving parameters corresponding to a type of the UE; in which the PDCCH signaling carries random access response control information of the UE; in which different types of UEs correspond to different PDCCH signalings, and the random access response control information is configured to indicate scheduling information associated with a random access response 502: sending a random access preamble to a base station; in which the random access preamble carries type indication information indicating the type of the UE

FIG. 6

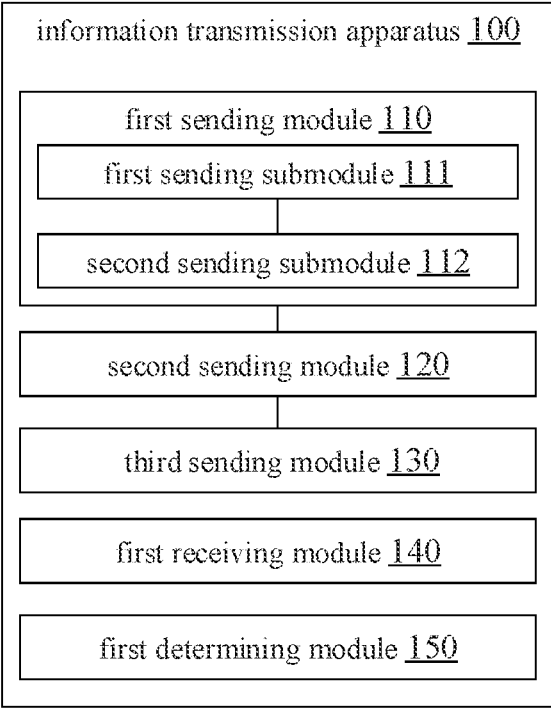

information transmission apparatus 100 first sending module 110 first sending submodule 111 second sending submodule 112 second sending module 120 third sending module 130 first receiving module 140 first determining module 150

FIG. 7

INFORMATION TRANSMISSION METHOD AND APPARATUS, AND COMMUNICATION DEVICE, AND STORAGE MEDIUM USING PDCCH INDICATION WITH RANDOM ACCESS PROCEDURE

CROSS-REFERENCE TO RELATED APPLICATION

The present application is a US national phase application of International Application No. PCT/CN2020/098273, filed Jun. 24, 2020, the entire contents of which are incorporated herein by reference.

TECHNICAL FIELD

The present disclosure relates to, but is not limited to, the technical field of wireless communication, and in particular to an information transmission method, an information transmission method apparatus, a communication device, and a storage medium.

BACKGROUND

In the fourth generation (4G) cellular mobile communication system, in order to support the Internet of Things services, a machine type communication (MTC) technology and a narrow band Internet of Things (NB-IoT) technology have been proposed, which are mainly aimed at low-speed and high-latency scenarios, such as meter reading and environmental monitoring scenarios. The NB-IoT technology generally supports a maximum rate of a few hundred k, and the MTC technology generally supports a maximum rate of a few M. In addition, with the continuous development of the Internet of Things services, such as the popularity of video surveillance, intelligent home, wearable devices, industrial sensor monitoring and the like, these services generally require a rate of 10M to 100M, and also have relatively high requirements for the latency. Thus, it is difficult for the MTC and NB-IoT technologies in LTE to meet these requirements.

In the new radio (NR) of the fifth generation (5G) cellular mobile communication system, a new type of user equipment (UE) is used to meet the requirements of such mid-end Internet of Things devices. The new type of the UE is called a reduced capability UE or a reduced capability new radio (NR-lite) for short.

The requirements for the reduced capability UE are low cost, low complexity, a certain degree of coverage enhancement and power saving. Since the current 5G NR is designed for high-end terminals such as high-speed and low-latency terminals, the current design cannot meet the above-mentioned requirements for the reduced capability UE. Therefore, it is necessary to modify the current NR system to meet the requirements for the reduced capability UE.

SUMMARY

In view of this, embodiments of the present disclosure provide an information transmission method, an information transmission apparatus, a communication device, and a storage medium.

According to a first aspect of embodiments of the present disclosure, an information transmission method is provided. The information transmission method is applied to a base station, and includes sending a physical downlink control channel (PDCCH) signaling corresponding to a type of a user equipment (UE) according to the type of the UE. The PDCCH signaling carries random access response control information for the UE. Different types of UEs correspond to different PDCCH signalings, and the random access response control information is configured to indicate scheduling information associated with a random access response.

According to a second aspect of embodiments of the present disclosure, an information transmission method is provided. The information transmission method is applied to a user equipment (UE), and includes receiving a physical downlink control channel (PDCCH) signaling with receiving parameters corresponding to a type of the UE. The PDCCH signaling carries random access response control information of the UE. Different types of UEs correspond to different PDCCH signalings, and the random access response control information is configured to indicate scheduling information associated with a random access response.

According to a third aspect of embodiments of the present disclosure, a communication device. The communication device includes a processor; a transceiver; a memory; and an executable program stored in the memory and capable of being run by the processor. The processor is configured to execute steps of the information transmission method according to the first aspect or the second aspect when running the executable program.

It is to be understood that both the foregoing general description and the following detailed description are illustrative and explanatory only and are not intended to limit the embodiments of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of embodiments of the present disclosure.

FIG. 1 is a schematic diagram illustrating a wireless communication system according to an illustrative embodiment.

FIG. 2 is a flowchart illustrating an information transmission method according to an illustrative embodiment.

FIG. 3 is a schematic diagram illustrating CCH resource candidate positions according to an illustrative embodiment.

FIG. 4 is a flowchart illustrating another information transmission method according to an illustrative embodiment.

FIG. 5 is a flowchart illustrating still another information transmission method according to an illustrative embodiment.

FIG. 6 is a flowchart illustrating yet another information transmission method according to an illustrative embodiment.

FIG. 7 is a block diagram illustrating an information transmission apparatus according to an illustrative embodiment.

DETAILED DESCRIPTION

Figure 8:
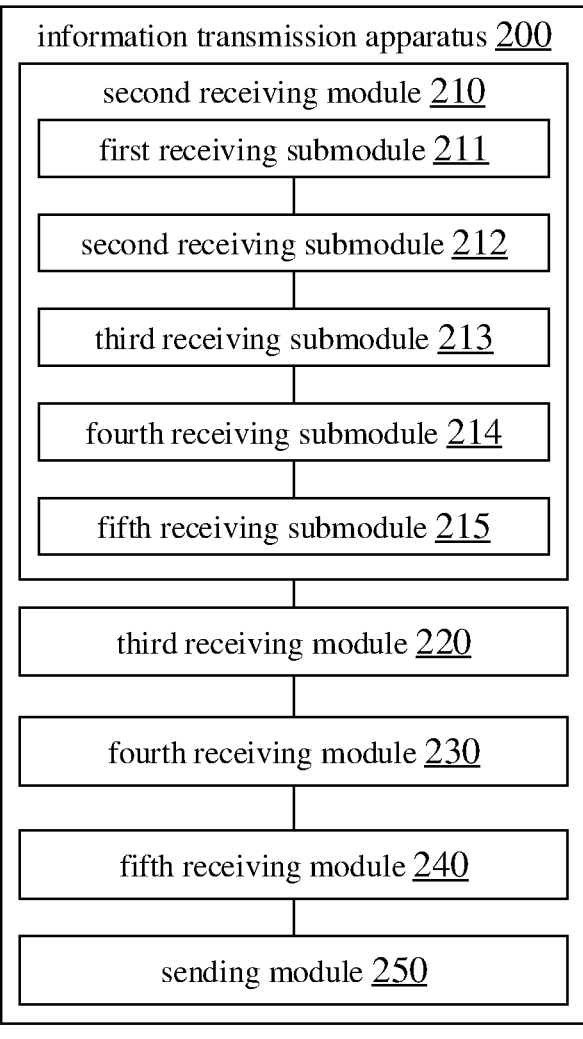
FIG. 8 is a block diagram illustrating another information transmission apparatus according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims, "a/an", "said" and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly second information may also be called first information. Depending on the context, the word "if" as used herein may be interpreted as "upon" or "when" or "in response to determining".

FIG. 1 is a schematic diagram illustrating a wireless communication system according to an illustrative embodiment. As shown in FIG. 1, the wireless communication system is a communication system based on cellular mobile communication technology, and the wireless communication system may include a plurality of terminals 11 and a plurality of base stations 12.

The terminal 11 may be a device that provides voice and/or data connectivity to a user. The terminal 11 may communicate with one or more core networks via a radio access network (RAN). The terminal 11 may be an Internet of Things terminal, such as a sensor device, a mobile phone (or called a "cellular" phone) and a computer having an Internet of Things terminal. For example, the terminal 11 may be a fixed, portable, pocket, hand-held, built-in computer or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a trip computer with a wireless communication function, or a wireless communication device externally connected to the trip computer. Alternatively, the terminal 11 may also be a roadside device, for example, it may be a street lamp, a signal lamp, or other roadside devices with a wireless communication function.

The base station 12 may be a network side device in a wireless communication system. The wireless communication system may be the fourth generation mobile communication technology (4G) system, also known as a long term evolution (LTE) system. Alternatively, the wireless communication system may also be the fifth generation mobile communication technology (5G) system, also called a new radio (NR) system or 5G NR system. Alternatively, the wireless communication system may also be a next generation system of the 5G system. An access network in the 5G system may be called a new generation-radio access network (NG-RAN). Alternatively, the wireless communication system may also be a MTC system.

The base station 12 may be an evolved base station (eNB) adopted in a 4G system. Alternatively, the base station 12 may also be a central distributed architecture base station (gNB) in the 5G system. When the base station 12 adopts a central distributed architecture, the base station 12 generally includes a central unit (CU) and at least two distributed units (DU). The central unit is provided with a protocol stack of a packet data convergence protocol (PDCP) layer, a radio link control (RLC) layer, or a media access control (MAC) layer. A protocol stack of a physical (PHY) layer is provided in the distributed unit. The specific implementation manner of the base station 12 is not be limited in embodiments of the present disclosure.

A wireless connection may be established between the base station 12 and the terminal 11 through a wireless air interface. In some embodiments, the wireless air interface is a wireless air interface based on the fourth generation mobile communication network technology (4G) standard. Alternatively, the wireless air interface is a wireless air interface based on the fifth generation mobile communication network technology (5G) standard. For example, the wireless air interface is a new radio. Alternatively, the wireless air interface may also be a wireless air interface based on a next generation mobile communication network technology standard based on 5G.

In some embodiments, an E2E (end to end) connection may also be established between terminals 11, such as a V2V (vehicle to vehicle) communication, a V2I (vehicle to infrastructure) communication and a V2P (vehicle to pedestrian) communication in vehicle to everything (V2X) communication scenes.

In some embodiments, the above-mentioned wireless communication system may further include a network management device 13.

A plurality of base stations 12 are connected to the network management device 13 respectively. The network management device 13 may be a core network device in the wireless communication system. For example, the network management device 13 may be a mobility management entity (MME) in an evolved packet core network (EPC). Alternatively, the network management device may also be other core network devices, such as a serving gate way (SGW), a public data network gateway (PGW), a policy and charging rules function unit (PCRF) or a home subscriber server (HSS). The implementation form of the network management device 13 is not limited in embodiments of the present disclosure.

Execution entities involved in embodiments of the present disclosure include, but are not limited to, a user equipment such as a terminal supporting 5G cellular mobile communication, and a base station.

The application scenario of embodiments of the present disclosure is that at present, when physical random access channel (PRACH) resources used by UEs performing random access have the same time and the same frequency, the random access responses of the UEs will be scheduled by the same PDCCH signaling in the same physical downlink shared channel (PDCCH) resource, that is, scheduled by the same random access response (RAR) PDCCH signaling. A search space carrying the RAR scheduling in NR is called type-1 PDCCH common search space (type-1 PDCCH CSS), and the carried PDCCH signaling is scrambled via a random access radio network temporary identifier (RA-RNTI) for cyclic redundancy check (CRC).

The search space of the RAR PDCCH signaling determines a corresponding CCE resource in a corresponding CORESET according to a resource determination rule. The resource determination rule may be represented by the following expression (1):

$$L \cdot \left\{ \left( \left[ Y_{p,n_{s,f}^{\mu}} + \left\lfloor \frac{m_{s,n_a} \cdot N_{CCE,p}}{L \cdot M_{s,max}^{(L)}} \right\rfloor + n_a \right) \bmod \lfloor N_{CCE,p} / L \rfloor \right\} + i \right. \tag{1}$$

where $$Y_{p,n_{s,f}^{\mu}}$$

represents an iteration value, and for a search space, $$Y_{p,n_{s,f}^{\mu}} = 0;$$

$N_{CCE,p}$ represents a total number of CCEs contained in a CORESET, p represents a $p^{th}$ physical resource block set; L represents a CCE aggregation level, $$i = 0, \dots, L - 1; M_{s,max}^{(L)}$$

represents the number of candidate transmission positions corresponding to the CCE aggregation level L, and $$m_{s,n_a} = 0, \dots, M_{s,max}^{(L)} - 1; n_a; n_a$$

represents a value of a carrier indicator field, and for a search space, $n_a$=0.

After N time units after a UE sends a random access request, a user starts to monitor the RAR PDCCH signaling in the type-1 PDCCH CSS. The entire monitoring will last for X time units, and if the user does not monitor any RAR PDCCH signaling within the X time units, it may be determined that the random access fails. The X time units here are called a random access response window.

A reduced capability UE and a NR non-reduced capability UE need to monitor the random access response together by using the same RAR PDCCH resource and the same RAR PDSCH resource. The random access PDCCH signaling is transmitted in one search space, but in practice, the reduced capability UE and the NR non-reduced capability UE have different capabilities and share a set of random access transmission and reception procedures, which will limit the flexibility.

Embodiments of the present disclosure provide an information transmission method which can be applied to a base station in a mobile communication network. As shown in FIG. 2, the information transmission method may include step 201.

In step 201, a PDCCH signaling corresponding to a type of a UE is sent according to the type of the UE. The PDCCH signaling carries random access response control information for the UE. Different types of UEs correspond to different PDCCH signalings, and the random access response control information is configured to indicate scheduling information associated with a random access response.

The different types of UEs may be UEs with different data transmission capabilities and/or different signal reception capabilities. Here, the data transmission capability may include a transmission rate, and/or a transmission latency, and/or a buffer size, and/or a size of a received transmission block, etc. There may be two or more types of UEs.

In some embodiments, a first type of UE and a second type of UE may be two types of various types of the UEs. The first type of UE may be a reduced capability UE in a 5G cellular mobile communication system. The second type of UE may be a non-reduced capability UE in the 5G cellular mobile communication system, such as an enhanced mobile broadband (eMBB) terminal. The first type of UE has a larger buffer, a smaller number of transmissions, a higher transmission latency, and a larger transmission block received in a single reception, as compared with the second type of UE.

The scheduling information of the random access response may include PDSCH resource information and modulation and coding strategy information of the random access response. The scheduling information of the random access response may be downlink control information (DCI) transmitted using a PDCCH resource. The base station may carry the random access response control information in the PDCCH signaling, and send the random access response based on the transmission resource indicated by the random access response control information. The UE receives and parses the random access response control information, and receives the random access response at the PDSCH resource and modulation and coding strategy indicated by the random access response control information. Here, the PDCCH signaling may be a RAR PDCCH signaling.

The random access response control information of the first type of UE and the random access response control information of the second type of UE are carried in the same PDCCH signaling. The first type of UE and the second type of UE may be UEs with different data transmission capabilities and/or different signal reception capabilities. Thus, the same PDCCH signaling needs to meet data transmission requirements and/or signal quality requirements of the first type of UE and the second type of UE at the same time, such that a range of the PDCCH signaling resource is limited by both the first type of UE and the second type of UE, thus reducing the flexibility of the PDCCH signaling resource configuration.

Here, the first type of PDCCH signaling and the second type of PDCCH signaling may be used to carry the random access response control information for the first type of UE and the random access response control information for the second type of UE, respectively. The first type of PDCCH signaling is different from the second type of PDCCH signaling. Here, the first type of PDCCH signaling being different from the second type of PDCCH signaling may mean that a type of the first PDCCH signaling is different from a type of the second PDCCH signaling (e.g. using different types of DCIs to carry the random access response control information); and may also mean that the first PDCCH signaling and the second PDCCH signaling are the same type of signaling, but adopt different transmission processes (for example, different transmission resources, different transmission parameters and/or different transmission rules, etc.) for transmission.

For example, the first type of PDCCH signaling and the second type of PDCCH signaling may be PDCCH signalings with different transmission resources. For example, a search space of the first type of PDCCH signaling may be different from that of the second type of PDCCH signaling. Alternatively, a transmission period of the first type of PDCCH signaling may be different from a transmission period of the second type of PDCCH signaling. Alternatively, a transmission bandwidth of the first type of PDCCH signaling may be different from a transmission bandwidth of the second type of PDCCH signaling.

Different types of PDCCH signalings may meet data transmission requirements and/or signal quality requirements of different types of UEs. For example, in case the first type of UE has higher requirements on signal quality, the first type of PDCCH signaling having a frequency domain resource with less interference may be used.

When the UE receives the PDCCH signaling, the UE may receive the PDCCH signaling corresponding to the type of the UE according to the receiving parameters corresponding to the type of the UE. The receiving parameters may be preset inside the UE. The receiving parameters may be a transmission resource parameter of the PDCCH signaling, and/or a PDCCH descrambling sequence, and/or a time frequency resource parameter of a random access search space of the PDCCH signaling, and the like.

In some embodiments, the first type of UE may receive the first type of PDCCH signaling according to the receiving parameters corresponding to the first type of UE.

The random access response control information carried by different PDCCH signalings may be different, and different random access response control information may indicate different scheduling information of random access responses. In this way, the different types of UEs may receive their respective random access responses on the different transmission resources, which improves the transmission flexibility of the random access responses and reduces the coupling between the random access responses of the different types of UEs.

In this way, the PDCCH signaling corresponding to the type of the UE is used to carry the random access response control information corresponding to the type of the UE. On the one hand, the use of the PDCCH signaling corresponding to the type of the UE to carry the random access response control information meets different transmission requirements of the different types of UEs, and improves the communication efficiency. On the other hand, the different types of PDCCH signalings may meet the transmission requirements of the random access response control information of the different types of UEs, thus reducing the coupling between the random access response control information of the different types of UEs, and improving the transmission flexibility of the random access response control information.

In some embodiments, search spaces of the different PDCCH signalings corresponding to the different types of UEs belong to different control resource sets (CORESETs).

The CORESET includes resources such as a frequency band occupied by the PDCCH signaling in a frequency domain in the search space, and the number of orthogonal frequency division multiplexing (OFDM) symbols occupied in a time domain.

The base station may adopt different CORESETs to send the PDCCH signalings corresponding to the different types of UEs, respectively.

The UE may receive the PDCCH signaling based on the CORESET corresponding to the type of the UE.

In some embodiments, CORESET #1 may be used for the configuration of the non-reduced capability UEs, and CORESET #0 may be used for the configuration of the reduced capability UEs.

In this way, the random access response control information of the different types of UEs may be carried on the PDCCH signalings carried by the different CORESETs, such that the different PDCCH signalings may be used to carry the random access response control information of the different types of UEs.

In some embodiments, search spaces of the different PDCCH signalings corresponding to the different types of UEs are different.

Here, the PDCCH signalings corresponding to the different types of UEs may be carried by the different search spaces.

Here, the receiving parameters may be resource parameters of the search spaces, and the different types of UEs may receive the respective PDCCHs in the search spaces corresponding to the types of UEs according to the resource parameters of the respective search spaces.

The resource parameters may include frequency domain parameters and/or time domain parameters of the search space. Different frequency domain parameters may indicate different frequency domain resources, and different time domain parameters may indicate different time domain resources.

The search space corresponding to the type of the UE may be configured according to the different types of UEs. For example, for transmission capabilities of the different types of UEs, search spaces corresponding to the transmission capabilities may be configured.

In this way, the different search spaces carry the PDCCH signalings corresponding to the different types of UEs, such that the search space of the PDCCH signaling matches the corresponding type of the UE, which improves the flexibility of the PDCCH signaling carrying the random access response control information, makes the different types of PDCCH signalings meet the transmission requirements of the random access response control information of the different types of UEs, reduces the coupling between the random access response control information of the different types of UEs, and reduces an error rate caused by data decoding during the decoupling, thus improving a success rate of the UE in receiving the PDCCH signaling.

In some embodiments, sending the PDCCH signaling corresponding to the type of the UE includes sending the PDCCH signaling on a candidate control channel element (CCE) resource determined according to a resource determination rule. The resource determination rules corresponding to the different types of UEs are different.

Here, the CCE resources determined by using different rule parameters on a shared CORESET of the different types of UEs are different.

The CCE resource is a basic unit of the shared search space transmission resource carrying the PDCCH signaling. The search space transmission resource carrying the PDCCH signaling may have one or more CCE resources.

The CCE resource carrying the PDCCH signaling may be determined using the resource determination rule shown in the expression (1). Different resource determination rules may be used to obtain different CCE resources.

Here, different resource determination rules may be provided for the different types of UEs on the shared CORESET of the different types of UEs, so as to obtain different candidate CCE resources. The different candidate CCE resources may be used to carry the PDCCH signalings of the different types of UEs.

In this way, by determining the different resource determination rules for the different types of UEs, the random access response control information of the different types of UEs may be carried on the PDCCH signalings carried by the different CCE resources, such that the different PDCCH signalings may be used to carry the random access response control information of the different types of UEs.

In some embodiments, rule parameters of the resource determination rules corresponding to the different types of UEs are different. The rule parameters include offset parameters and/or random parameters.

For the different types of UEs, different offset parameters and/or random parameters may be used.

Here, the offset parameters may be 0. Based on the different offset parameters, different CCE resources may be obtained with the resource determination rules, so as to achieve the different transmission resources for the PDCCH signalings.

Alternatively, predetermined rule parameters of the resource determination rules may be randomized, and different CCE resources may be obtained by using different randomized parameters.

In some embodiments, an offset parameter X is determined on a basis of the resource determination rule shown in the expression (1), and the resource determination rule shown in the following expression (2) may be obtained. A CCE resource obtained using the resource determination rule shown in the expression (1) is different from a CCE resource obtained using the resource determination rule shown in the expression (2):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} + X \right) \mod \lfloor N_{CCE,p} / L \rfloor \right\} + i \quad (2)$$

where $$Y_{p,n_{s,f}^{\mu}}$$

represents an iteration value, and for a search space, $$Y_{p,n_{s,f}^{\mu}} = 0;$$

$N_{CCE,p}$ represents a total number of CCEs contained in a CORESET; p represents a pth physical resource block set; L represents a CCE aggregation level, and $$i = 0, \dots, L-1; M_{s,max}^{(L)}$$

represents the number of candidate transmission positions corresponding to the CCE aggregation level L, and $$m_{s,n_a} = 0, \dots, M_{s,max}^{(L)} - 1; n_a$$

represents a value of a carrier indicator field, and for a search space, $n_{CI}=0$.

For the first type of UE, X may not be equal to 0, and for the second type of UE, X may be 0. In this way, the second type of UE may transmit the second PDCCH signaling by using a CCE resource in a related art. The first type of UE may transmit the first PDCCH signaling by using a CCE resource different from that of the second type of UE.

For example, for the configuration of the non-reduced capability UE, X may be 0. For the configuration of the reduced capability UE, X may not be equal to 0.

The offset parameter may be an offset of a specific parameter of an existing resource determination rule. For example, the offset parameter may be an offset of an expression $$Y_{p,n_{s,f}^{\mu}}.$$

In some embodiments, for the configuration of the non-reduced capability UE, the offset of $$Y_{p,n_{s,f}^{\mu}}$$

may be 0, and for the configuration of the reduced capability UE, the offset of $$Y_{p,n_{s,f}^{\mu}}$$

may be a non-zero number. In this way, different CCE resources may be configured for the non-reduced capability UE and the reduced capability UE.

In some embodiments, aggregation levels of PDCCH resources of the different PDCCH signalings corresponding to the different types of UEs are different; and/or the number of candidate transmission positions of the PDCCH resources of the different PDCCH signalings corresponding to the different types of UEs are different; and/or candidate repeated transmission positions of the different PDCCH signalings corresponding to the different types of UEs are different.

The aggregation level may be the number of CCE resources constituting one PDCCH resource. The aggregation level may be 1, 2, 4 or 8. The aggregation level may represent the number of CCE resources in the PDCCH resource. For example, the number of CCE resources in the PDCCH resource with an aggregation level of 8 is 8.

The PDCCH resources of different aggregation levels are different. Therefore, the PDCCH resources with different aggregation levels are used to transmit the PDCCH signalings corresponding to the different types of UEs, respectively. In this way, the different PDCCH signalings may be used to carry the random access response control information of the different types of UEs.

There are a plurality of CCE resources in the search space. For example, there are 88 CCE resources in the search space. There may be a plurality of positions of the PDCCH resources of the same aggregation level in the search space. That is, there are a plurality of candidate transmission positions of the PDCCH resource. Here, the PDCCH resources at different candidate transmission positions may be used to transmit the first PDCCH signaling and the second PDCCH signaling, respectively. In this way, the different PDCCH signalings may be used to carry the random access response control information of the different types of UEs.

In some embodiments, as shown in FIG. 3, there are n CCE resources in the search space, such as n=88. The PDCCH resources with an aggregation level of 8 may have two candidate positions, i.e., candidate position 1 and candidate position 2, in the search space. The PDCCH resource at the candidate position 1 may be used to transmit the first PDCCH signaling, and the PDCCH resource at the candidate position 2 may be used to transmit the second PDCCH signaling.

During a retransmission process of the PDCCH signaling, the PDCCH signalings of the different types of UEs may use different candidate retransmission positions. In this way, for the retransmission of the PDCCH signaling, the different PDCCH signalings may be used to carry the random access response control information of the different types of UEs.

In some embodiments, sending the PDCCH signaling corresponding to the type of the UE includes sending the PDCCH signaling within a random access response window corresponding to the type of the UE. The random access response windows corresponding to the different types of UEs are different.

After N time units after the user sends a random access preamble, the UE starts to monitor the PDCCH signaling in the type-1 PDCCH CSS. A time period for monitoring the PDCCH signaling is called a random access response window. The random access response window may last for M time units. If the user does not monitor any PDCCH signaling within the M time units, it is proved that the random access fails.

Here, for the different types of UEs, the base station may send the PDCCH signalings in the different random access response windows. The UEs may monitor the PDCCH signalings in different random access response windows according to the types of the UEs.

In this way, by providing the different random access response windows for the different types of UEs, the random access response control information of the different types of UEs may be carried on the PDCCH signalings using the random access response windows, such that the different PDCCH signalings may be used to carry the random access response control information of the different types of UEs.

In some embodiments, time intervals between the random access response windows corresponding to the different types of UEs and random access preambles are different; and/or durations of the random access response windows corresponding to the different types of UEs are different.

After N time units after the user sends the random access preamble, the UE starts to monitor the PDCCH signaling in the type-1 PDCCH CSS. The time period for monitoring PDCCH signaling is called a random access response window. The random access response window may last for M time units. If the user does not monitor any PDCCH signaling within the M time units, it is proved that the random access fails.

Here, for the different types of UEs, the values of N and/or M are different, so as to obtain different random access response windows.

In some embodiments, scrambling sequences of the different PDCCH signalings corresponding to the different types of UEs are different.

In order to distinguish the PDCCH signalings corresponding to the different types of UEs, the base station may use different scrambling sequences to scramble the PDCCH signalings corresponding to the different types of UEs, respectively.

In some embodiments, the first type of PDCCH signaling is scrambled by using a scrambling sequence corresponding to the first type of UE, and the second type of PDCCH signaling is scrambled by using a scrambling sequence corresponding to the second type of UE.

For example, the first type of PDCCH signaling and the second type of PDCCH signaling may be scrambled by using UE identifiers corresponding to the first type of UE and the second type of UE, respectively. Here, the UE identifier of the first type of UE is different from the UE identifier of the second type of UE. The UE identifier of the first type of UE being different from the UE identifier of the second type of UE may mean that the number of bits of the identifiers is different, and/or the encoding processes of the identifiers are different.

The receiving parameter may be the descrambling sequence of the UE. UEs of the same type have the same scrambling sequence and the same descrambling sequence. After receiving the PDCCH signaling, the UE may use the corresponding descrambling sequence to descramble the PDCCH signaling. If the descrambling is successful, it is determined that the PDCCH signaling is the PDCCH signaling sent to the UE.

In this way, the different types of PDCCH signalings are carried in the same search space, which improves the carrying capacity of the search space and improves the communication efficiency.

In some embodiments, the scrambling sequences are random access radio network temporary identifiers (RA-RNTIs). The RA-RNTIs of the different types of UEs are different.

Here, the different RA-RNTIs may be allocated to the different types of UEs, and the base station uses the RA-RNTI corresponding to the type of the UE to scramble the PDCCH signaling.

After the UE side receives the PDCCH signaling, the UE side may adopt the RA-RNTI corresponding to the type of the UE to perform descrambling.

In some embodiments, the RA-RNTI in the related art may be used for the non-reduced capability UE. For the reduced capability UE, a new different RA-RNTI may be determined by a communication protocol, or a different RA-RNTI may be configured by the base station.

In some embodiments, a calculation manner of RA-RNTIs of the different types of UEs may be determined by the communication protocol. For the RA-RNTI of the first type of UE, the calculation manner shown in the following expression (3) in the related art may be used for calculation:

$$RA\text{-}RNTI = 1 + t\_id + 10 * f\_id \qquad (3)$$

where t_id represents a number (ranging from 0 to 9) of a sub-frame identifier (ID) of a starting position of sending a random access preamble, and f_id represents a value (ranging from 0 to 5) of f_RA in a four-element group.

For the second type of UE, the calculation parameters are adjusted on the basis of the expression (3), and the RA-RNTI of the second type of UE is calculated, such that the RA-RNTI of the first type of UE is different from the RA-RNTI of the second type of UE. For example, a constant 1 may be adjusted on the basis of the expression (3) to obtain the expression (4), and the RA-TNTI of the second type UE is calculated through the calculation manner shown in the expression (4).

$$\text{RA-RNTI}=2+t\_id+10*f\_id \qquad (4)$$

In some embodiments, PDSCH resources corresponding to the different types of UEs scheduled by the random access response control information are different. The PDSCH resources are configured to transmit the random access response.

The random access response control information in the PDCCH signaling may be used to schedule the PDSCH resource for the random access response. Here, for the different types of UEs, the different PDSCH resources may be scheduled for the transmission of the random access responses.

In this way, the random access response of the UE is transmitted via the PDSCH resource corresponding to the type of the UE. On the one hand, the PDSCH resource corresponding to the type of the UE is used to transmit the random access response to meet different transmission requirements of the different types of UEs and improve the communication efficiency. On the other hand, the coupling between the random access responses of the different types of UEs is reduced, and the transmission flexibility of the random access responses is improved.

In some embodiments, the information transmission method further includes carrying random access response control information of a first type of UE with a PDCCH signaling corresponding to a second type of UE in response to a bandwidth of an initial broadband part (BWP) of the first type of UE being equal to a bandwidth of CORESET #0.

The base station may be configured to use the PDCCH signalings carrying the random access response control information of the different UEs. For example, the base station may be configured to use the second type of PDCCH signaling for carrying.

In the configuration of the search space, if initial broadband parts (BWPs) of the different types of UEs are the same, the different types of UEs may monitor the same search space. That is, the PDCCH signalings of the different types of UEs are the same.

In some embodiments, whether the non-reduced capability UE and the reduced capability UE use the different PDCCH signalings may be configured by the base station or determined according to other conditions. For example, if a bandwidth of an initial BWP of the reduced capability UE is equal to a bandwidth of CORESET #0, the reduced capability UE is configured to use the same PDCCH signaling as the non-reduced capability UE to carry the random access response control information.

In this way, the base station may flexibly configure the PDCCH used by the UE.

In some embodiments, the information transmission method further includes sending a configuration signaling. The configuration signaling is configured to indicate that random access response control information of a first type of UE is carried by a PDCCH signaling corresponding to the first type of UE or by a PDCCH signaling corresponding to a second type of UE.

The base station may configure the PDCCH signalings carrying the random access response control information for the different types of UEs. For example, for the first type of UE, the base station may configure the second type of PDCCH signaling of the second type of UE to carry the random access response control information.

In this way, the base station may flexibly configure the PDCCH used by the UE.

In some embodiments, as shown in FIG. 4, the information transmission method further includes step 202 and step 203.

In step 202, a random access preamble sent by the UE is received.

In step 203, the type of the UE is determined according to type indication information carried in the random access preamble.

When the UE accesses the base station through a 2-step random access process or a 4-step random access process, the UE first sends a random access preamble to the base station. The UE may carry the type indication information indicating the type of the UE in the random access preamble.

After the base station receives the random access preamble, the base station determines the type of the UE according to the type indication information, and then sends the PDCCH signaling corresponding to the type of the UE.

Embodiments of the present disclosure provide an information transmission method which can be applied to a UE in a mobile communication network. As shown in FIG. 5, the information transmission method may include step 501.

In step 501, a PDCCH signaling is received with receiving parameters corresponding to a type of the UE. The PDCCH signaling carries random access response control information of the UE. Different types of UEs correspond to different PDCCH signalings, and the random access response control information is configured to indicate scheduling information associated with a random access response.

The different types of UEs may be UEs with different data transmission capabilities and/or different signal reception capabilities. Here, the data transmission capability may include a transmission rate, and/or a transmission latency, and/or a buffer size, and/or a size of a received transmission block, etc. There may be two or more types of UEs.

In some embodiments, a first type of UE and a second type of UE may be two types of various types of the UEs. The first type of UE may be a reduced capability UE in a 5G cellular mobile communication system. The second type of UE may be a non-reduced capability UE in the 5G cellular mobile communication system, such as an enhanced mobile broadband (eMBB) terminal. The first type of UE has a larger buffer, a smaller number of transmissions, a higher transmission latency, and a larger transmission block received in a single reception, as compared with the second type of UE.

The scheduling information of the random access response may include PDSCH resource information and modulation and coding strategy information of the random access response. The scheduling information of the random access response may be downlink control information (DCI) transmitted using a PDCCH resource. The base station may carry the random access response control information in the PDCCH signaling, and send the random access response based on the transmission resource indicated by the random access response control information. The UE receives and parses the random access response control information, and receives the random access response at the PDSCH resource and modulation and coding strategy indicated by the random access response control information. Here, the PDCCH signaling may be a RAR PDCCH signaling.

The random access response control information of the first type of UE and the random access response control information of the second type of UE are carried in the same PDCCH signaling. The first type of UE and the second type of UE may be UEs with different data transmission capabilities and/or different signal reception capabilities. Thus, the same PDCCH signaling needs to meet data transmission requirements and/or signal quality requirements of the first type of UE and the second type of UE at the same time, such that a range of the PDCCH signaling resource is limited by both the first type of UE and the second type of UE, thus reducing the flexibility of the PDCCH signaling resource configuration.

Here, the first type of PDCCH signaling and the second type of PDCCH signaling may be used to carry the random access response control information for the first type of UE and the random access response control information for the second type of UE, respectively. The first type of PDCCH signaling is different from the second type of PDCCH signaling. Here, the first type of PDCCH signaling being different from the second type of PDCCH signaling may mean that a type of the first PDCCH signaling is different from a type of the second PDCCH signaling (e.g. using different types of DCIs to carry the random access response control information); and may also mean that the first PDCCH signaling and the second PDCCH signaling are the same type of signaling, but adopt different transmission processes (for example, different transmission resources, different transmission parameters and/or different transmission rules, etc.) for transmission.

For example, the first type of PDCCH signaling and the second type of PDCCH signaling may be PDCCH signalings with different transmission resources. For example, a search space of the first type of PDCCH signaling may be different from that of the second type of PDCCH signaling. Alternatively, a transmission period of the first type of PDCCH signaling may be different from a transmission period of the second type of PDCCH signaling. Alternatively, a transmission bandwidth of the first type of PDCCH signaling may be different from a transmission bandwidth of the second type of PDCCH signaling.

Different types of PDCCH signalings may meet data transmission requirements and/or signal quality requirements of different types of UEs. For example, in case the first type of UE has higher requirements on signal quality, the first type of PDCCH signaling having a frequency domain resource with less interference may be used.

When the UE receives the PDCCH signaling, the UE may receive the PDCCH signaling corresponding to the type of the UE according to the receiving parameters corresponding to the type of the UE. The receiving parameters may be preset inside the UE. The receiving parameters may be a transmission resource parameter of the PDCCH signaling, and/or a PDCCH descrambling sequence, and/or a time frequency resource parameter of a random access search space of the PDCCH signaling, and the like.

In some embodiments, the first type of UE may receive the first type of PDCCH signaling according to the receiving parameters corresponding to the first type of UE.

The random access response control information carried by different PDCCH signalings may be different, and different random access response control information may indicate different scheduling information of random access responses. In this way, the different types of UEs may receive their respective random access responses on the different transmission resources, which improves the transmission flexibility of the random access responses and reduces the coupling between the random access responses of the different types of UEs.

In this way, the PDCCH signaling corresponding to the type of the UE is used to carry the random access response control information corresponding to the type of the UE. On the one hand, the use of the PDCCH signaling corresponding to the type of the UE to carry the random access response control information meets different transmission requirements of the different types of UEs, and improves the communication efficiency. On the other hand, the different types of PDCCH signalings may meet the transmission requirements of the random access response control information of the different types of UEs, thus reducing the coupling between the random access response control information of the different types of UEs, and improving the transmission flexibility of the random access response control information.

In some embodiments, the receiving parameters include control resource set (CORESET) parameters.

Receiving the PDCCH signaling with the receiving parameters corresponding to the type of the UE includes receiving the PDCCH signaling on the CORESET of a search space of the PDCCH signaling corresponding to the type of the UE. The search spaces of the different PDCCH signalings corresponding to the different types of UEs belong to different CORESETs.

The CORESET includes resources such as a frequency band occupied by the PDCCH signaling in a frequency domain in the search space, and the number of OFDM symbols occupied in a time domain.

The base station may adopt different CORESETs to send the PDCCH signalings corresponding to the different types of UEs, respectively.

The UE may receive the PDCCH signaling based on the CORESET corresponding to the type of the UE.

In some embodiments, CORESET #1 may be used for the configuration of the non-reduced capability UEs, and CORESET #0 may be used for the configuration of the reduced capability UEs.

In this way, the random access response control information of the different types of UEs may be carried on the PDCCH signalings carried by the different CORESETs, such that the different PDCCH signalings may be used to carry the random access response control information of the different types of UEs.

In some embodiments, the receiving parameters includes resource parameters.

Receiving the PDCCH signaling with the receiving parameters corresponding to the type of the UE includes receiving the PDCCH signaling in a search space of the PDCCH signaling corresponding to the type of the UE with the resource parameter corresponding to the type of the UE. Search spaces of the different PDCCH signalings corresponding to the different types of UEs are different.

Here, the PDCCH signalings corresponding to the different types of UEs may be carried by the different search spaces.

Here, the receiving parameters may be resource parameters of the search spaces, and the different types of UEs may receive the respective PDCCHs in the search spaces corresponding to the types of UEs according to the resource parameters of the respective search spaces.

The resource parameters may include frequency domain parameters and/or time domain parameters of the search space. Different frequency domain parameters may indicate different frequency domain resources, and different time domain parameters may indicate different time domain resources.

The search space corresponding to the type of the UE may be configured according to the different types of UEs. For example, for transmission capabilities of the different types of UEs, search spaces corresponding to the transmission capabilities may be configured.

In this way, the different search spaces carry the PDCCH signalings corresponding to the different types of UEs, such that the search space of the PDCCH signaling matches the corresponding type of the UE, which improves the flexibility of the PDCCH signaling carrying the random access response control information, makes the different types of PDCCH signalings meet the transmission requirements of the random access response control information of the different types of UEs, reduces the coupling between the random access response control information of the different types of UEs, and reduces an error rate caused by data decoding during the decoupling, thus improving a success rate of the UE in receiving the PDCCH signaling.

In some embodiments, the resource parameters include rule parameters of a resource determination rule.

Receiving the PDCCH signaling with the receiving parameters corresponding to the type of the UE includes receiving the PDCCH signaling on a candidate control channel element (CCE) resource determined according to the resource determination rule of the PDCCH signaling corresponding to the type of the UE.

The resource determination rules corresponding to the different types of UEs are different.

Here, the CCE resources determined by using different rule parameters on a shared CORESET of the different types of UEs are different.

The CCE resource is a basic unit of the shared search space transmission resource carrying the PDCCH signaling. The search space transmission resource carrying the PDCCH signaling may have one or more CCE resources.

The CCE resource carrying the PDCCH signaling may be determined using the resource determination rule shown in the expression (1). Different resource determination rules may be used to obtain different CCE resources.

Here, different resource determination rules may be provided for the different types of UEs on the shared CORESET of the different types of UEs, so as to obtain different candidate CCE resources. The different candidate CCE resources may be used to carry the PDCCH signalings of the different types of UEs.

In this way, by determining the different resource determination rules for the different types of UEs, the random access response control information of the different types of UEs may be carried on the PDCCH signalings carried by the different CCE resources, such that the different PDCCH signalings may be used to carry the random access response control information of the different types of UEs.

In some embodiments, rule parameters of the resource determination rules corresponding to the different types of UEs are different. The rule parameters include offset parameters and/or random parameters.

For the different types of UEs, different offset parameters and/or random parameters may be used.

Here, the offset parameters may be 0. Based on the different offset parameters, different CCE resources may be obtained with the resource determination rules, so as to achieve the different transmission resources for the PDCCH signalings.

Alternatively, predetermined rule parameters of the resource determination rules may be randomized, and different CCE resources may be obtained by using different randomized parameters.

In some embodiments, an offset parameter X is determined on a basis of the resource determination rule shown in the expression (1), and the resource determination rule shown in the following expression (2) may be obtained. A CCE resource obtained using the resource determination rule shown in the expression (1) is different from a CCE resource obtained using the resource determination rule shown in the expression (2).

$$Y_{p,n_{s,f}^{\mu}}$$

represents an iteration value, and for a search space, $$Y_{p,n_{s,f}^{\mu}} = 0; N_{CCE,p}$$

represents a total number of CCEs contained in a CORE-SET; p represents a $p^{th}$ physical resource block set; L represents a CCE aggregation level, and $$i = 0, \dots, L-1; M_{s,max}^{(L)}$$

represents the number of candidate transmission positions corresponding to the CCE aggregation level L, and $$m_{s,n_a} = 0, \dots, M_{s,max}^{(L)} - 1;$$

$n_{CI}$ represents a value of a carrier indicator field, and for a search space, $n_{CI}=0$.

For the first type of UE, X may not be equal to 0, and for the second type of UE, X may be 0. In this way, the second type of UE may transmit the second PDCCH signaling by using a CCE resource in a related art. The first type of UE may transmit the first PDCCH signaling by using a CCE resource different from that of the second type of UE.

For example, for the configuration of the non-reduced capability UE, X may be 0. For the configuration of the reduced capability UE, X may not be equal to 0.

The offset parameter may be an offset of a specific parameter of an existing resource determination rule. For example, the offset parameter may be an offset of an expression $$Y_{p,n_{s,f}^{\mu}}.$$

In some embodiments, for the configuration of the non-reduced capability UE, the offset of $$Y_{p,n_{s,f}^{\mu}}$$

may be 0, and for the configuration of the reduced capability UE, the offset of $$Y_{p,n_{s,f}^{\mu}}$$

may be a non-zero number. In this way, different CCE resources may be configured for the non-reduced capability UE and the reduced capability UE.

In some embodiments, the resource parameters include at least one of aggregation levels of PDCCH resources of the different PDCCH signalings; and/or the number of candidate transmission positions of the PDCCH resources of the different PDCCH signalings; and/or candidate repeated transmission positions of the different PDCCH signalings.

The aggregation level may be the number of CCE resources constituting one PDCCH resource. The aggregation level may be 1, 2, 4 or 8. The aggregation level may represent the number of CCE resources in the PDCCH resource. For example, the number of CCE resources in the PDCCH resource with an aggregation level of 8 is 8.

The PDCCH resources of different aggregation levels are different. Therefore, the PDCCH resources with different aggregation levels are used to transmit the PDCCH signalings corresponding to the different types of UEs, respectively. In this way, the different PDCCH signalings may be used to carry the random access response control information of the different types of UEs.

There are a plurality of CCE resources in the search space. For example, there are 88 CCE resources in the search space. There may be a plurality of positions of the PDCCH resources of the same aggregation level in the search space. That is, there are a plurality of candidate transmission positions of the PDCCH resource. Here, the PDCCH resources at different candidate transmission positions may be used to transmit the first PDCCH signaling and the second PDCCH signaling, respectively. In this way, the different PDCCH signalings may be used to carry the random access response control information of the different types of UEs.

In some embodiments, as shown in FIG. 3, there are n CCE resources in the search space, such as n=88. The PDCCH resources with an aggregation level of 8 may have two candidate positions, i.e., candidate position 1 and candidate position 2, in the search space. The PDCCH resource at the candidate position 1 may be used to transmit the first PDCCH signaling, and the PDCCH resource at the candidate position 2 may be used to transmit the second PDCCH signaling.

During a retransmission process of the PDCCH signaling, the PDCCH signalings of the different types of UEs may use different candidate retransmission positions. In this way, for the retransmission of the PDCCH signaling, the different PDCCH signalings may be used to carry the random access response control information of the different types of UEs.

In some embodiments, the receiving parameters include parameters of random access response windows.

Receiving the PDCCH signaling with the receiving parameters corresponding to the type of the UE includes receiving the PDCCH signaling within a random access response window corresponding to the type of the UE.

The random access response windows corresponding to the different types of UEs are different.

After N time units after the user sends a random access preamble, the UE starts to monitor the PDCCH signaling in the type-1 PDCCH CSS. A time period for monitoring the PDCCH signaling is called a random access response window. The random access response window may last for M time units. If the user does not monitor any PDCCH signaling within the M time units, it is proved that the random access fails.

Here, for the different types of UEs, the base station may send the PDCCH signalings in the different random access response windows. The UEs may monitor the PDCCH signalings in different random access response windows according to the types of the UEs.

In this way, by providing the different random access response windows for the different types of UEs, the random access response control information of the different types of UEs may be carried on the PDCCH signalings using the random access response windows, such that the different PDCCH signalings may be used to carry the random access response control information of the different types of UEs.

In some embodiments, time intervals between the random access response windows corresponding to the different types of UEs and random access preambles are different; and/or durations of the random access response windows corresponding to the different types of UEs are different.

After N time units after the user sends the random access preamble, the UE starts to monitor the PDCCH signaling in the type-1 PDCCH CSS. The time period for monitoring PDCCH signaling is called a random access response window. The random access response window may last for M time units. If the user does not monitor any PDCCH signaling within the M time units, it is proved that the random access fails.

Here, for the different types of UEs, the values of N and/or M are different, so as to obtain different random access response windows.

In some embodiments, receiving the PDCCH signaling with the receiving parameters corresponding to the type of the UE includes descrambling the PDCCH signaling with a descrambling sequence corresponding to the type of the UE. The descrambling sequences of the different PDCCH signalings corresponding to the different types of UEs are different.

In order to distinguish the PDCCH signalings corresponding to the different types of UEs, the base station may use different scrambling sequences to scramble the PDCCH signalings corresponding to the different types of UEs, respectively.

In some embodiments, the first type of PDCCH signaling is scrambled by using a scrambling sequence corresponding to the first type of UE, and the second type of PDCCH signaling is scrambled by using a scrambling sequence corresponding to the second type of UE.

For example, the first type of PDCCH signaling and the second type of PDCCH signaling may be scrambled by using UE identifiers corresponding to the first type of UE and the second type of UE, respectively. Here, the UE identifier of the first type of UE is different from the UE identifier of the second type of UE. The UE identifier of the first type of UE being different from the UE identifier of the second type of UE may mean that the number of bits of the identifiers is different, and/or the encoding processes of the identifiers are different.

The receiving parameter may be the descrambling sequence of the UE. UEs of the same type have the same scrambling sequence and the same descrambling sequence. After receiving the PDCCH signaling, the UE may use the corresponding descrambling sequence to descramble the PDCCH signaling. If the descrambling is successful, it is determined that the PDCCH signaling is the PDCCH signaling sent to the UE.

In this way, the different types of PDCCH signalings are carried in the same search space, which improves the carrying capacity of the search space and improves the communication efficiency.

In some embodiments, the scrambling sequences are random access radio network temporary identifiers (RA-RNTIs). The RA-RNTIs of the different types of UEs are different.

Here, the different RA-RNTIs may be allocated to the different types of UEs, and the base station uses the RA-RNTI corresponding to the type of the UE to scramble the PDCCH signaling.

After the UE side receives the PDCCH signaling, the UE side may adopt the RA-RNTI corresponding to the type of the UE to perform descrambling.

In some embodiments, the RA-RNTI in the related art may be used for the non-reduced capability UE. For the reduced capability UE, a new different RA-RNTI may be determined by a communication protocol, or a different RA-RNTI may be configured by the base station.

In some embodiments, a calculation manner of RA-RNTIs of the different types of UEs may be determined by the communication protocol. For the RA-RNTI of the first type of UE, the calculation manner shown in the expression (3) in the related art may be used for calculation. t_id represents a number (ranging from 0 to 9) of a sub-frame identifier (ID) of a starting position of sending a random access preamble, and f_id represents a value (ranging from 0 to 5) of f_RA in a four-element group.

For the second type of UE, the calculation parameters are adjusted on the basis of the expression (3), and the RA-RNTI of the second type of UE is calculated, such that the RA-RNTI of the first type of UE is different from the RA-RNTI of the second type of UE. For example, a constant 1 may be adjusted on the basis of the expression (3) to obtain the expression (4), and the RA-TNTI of the second type UE is calculated through the calculation manner shown in the expression (4).

$$RA\text{-}RNTI = 2 + t\_id + 10 * f\_id \qquad (4)$$

In some embodiments, the information transmission method further includes receiving the random access response with a PDSCH resource scheduled by the random access response control information.

The PDSCH resources corresponding to the different types of UEs are different.

The random access response control information in the PDCCH signaling may be used to schedule the PDSCH resource for the random access response. Here, for the different types of UEs, the different PDSCH resources may be scheduled for the transmission of the random access responses.

In this way, the random access response of the UE is transmitted via the PDSCH resource corresponding to the type of the UE. On the one hand, the PDSCH resource corresponding to the type of the UE is used to transmit the random access response to meet different transmission requirements of the different types of UEs and improve the communication efficiency. On the other hand, the coupling between the random access responses of the different types of UEs is reduced, and the transmission flexibility of the random access responses is improved.

In some embodiments, the information transmission method further includes receiving resource instruction information of a first type of UE that is carried by a PDCCH signaling corresponding to a second type of UE and sent by a base station in response to a bandwidth of an initial broadband part (BWP) of the first type of UE being equal to a bandwidth of CORESET #0.

The base station may be configured to use the PDCCH signalings carrying the random access response control information of the different UEs. For example, the base station may be configured to use the second type of PDCCH signaling for carrying.

In the configuration of the search space, if initial broadband parts (BWPs) of the different types of UEs are the same, the different types of UEs may monitor the same search space. That is, the PDCCH signalings of the different types of UEs are the same.

In some embodiments, whether the non-reduced capability UE and the reduced capability UE use the different PDCCH signalings may be configured by the base station or determined according to other conditions. For example, if a bandwidth of an initial BWP of the reduced capability UE is equal to a bandwidth of CORESET #0, the reduced capability UE is configured to use the same PDCCH signaling as the non-reduced capability UE to carry the random access response control information.

In this way, the base station may flexibly configure the PDCCH used by the UE.

In some embodiments, the information transmission method further includes receiving a configuration signaling, and receiving the random access response control information with the PDCCH signaling indicated by the configuration signaling.

The base station may configure the PDCCH signalings carrying the random access response control information for the different types of UEs. For example, for the first type of UE, the base station may configure the second type of PDCCH signaling of the second type of UE to carry the random access response control information.

In this way, the base station may flexibly configure the PDCCH used by the UE.

In some embodiments, as shown in FIG. 6, the information transmission method further includes step 502.

In step 502, a random access preamble is sent to a base station. The random access preamble carries type indication information indicating the type of the UE.

When the UE accesses the base station through a 2-step random access process or a 4-step random access process, the UE first sends a random access preamble to the base station. The UE may carry the type indication information indicating the type of the UE in the random access preamble.

After the base station receives the random access preamble, the base station determines the type of the UE according to the type indication information, and then sends the PDCCH signaling corresponding to the type of the UE.

A specific example is provided below in combination with any of the above-mentioned embodiments.

The core of the solution is to use independent random access response sending procedures for a non-NR-lite UE and a NR-lite UE.

The first point is that RAR PDCCHs of the non-NR-lite UE and the NR-lite UE are transmitted, respectively. The following describes the processes to achieve independent transmissions.

The first process is that different CORESETs are configured for the NR-lite UE and the non-NR-lite UE to carry the corresponding type-1 PDCCH CSSs.

The second process is that the non-NR-lite UE and the NR-lite UE use different preset rules or use different parameters in preset rules to obtain CCE resources corresponding to respective search spaces. For example, the non-NR-lite UE still reuses an original rule, i.e., expression (1). The corresponding NR-lite UE may add an offset of X on the original basis, which is shown in expression (2). Alternatively, the NR-lite UE still uses the original rule, that is, the expression (1), except that a value of $$Y_{p,n_{s,f}^{\mu}}$$

is other numbers rather than 0.

The third process is that different random access response windows are configured for the NR-lite UE and the non-NR-lite UE, and different N values and different X values may be configured.

The fourth process is that different RA-RNTIs are used for different RAR PDCCHs.

The second point is that aggregation levels configured by the RAR PDCCHs of the NR-lite and/or candidate transmission positions of the corresponding PDCCHs may be different on the basis of the first point.

The third point is that the PDSCHs for transmitting RARs for the non-NR-lite UE and the NR-lite UE are different.

The fourth point is that whether to use different RAR transmission procedures for the non-NR-lite UE and the NR-lite UE may be configured by the base station or determined according to other conditions.

For example, when the base station configures an independent RAR transmission process for the NR-lite UE, that is, configures independent RAR PDCCH transmission parameters as in the first point, the NR-lite UE uses an independent RAR receiving process. If the base station does not configure additional parameters for the NR-lite UE, it is assumed that the user uses the same receiving process as the non-NR-lite UE.

For example, when a bandwidth of the initial WP is equal to a bandwidth of CORESET #0, it is assumed that the NR-lite UE may use the same RAR receiving process as the non-NR-lite UE at this time.

The fifth point is that the base station may distinguish a normal NR-lite UE from the non-NR-lite UE through a specific random access preamble. On the same PRACH time frequency resource, the random access preamble used by the NR-lite UE is different from that used by the non-NR-lite UE.

Embodiments of the present disclosure also provide an information transmission apparatus applied to a base station. FIG. 7 is a block diagram illustrating an information transmission apparatus 100 according to an illustrative embodiment. As shown in FIG. 7, the information transmission apparatus 100 includes a first sending module 110.

The first sending module 110 is configured to send a PDCCH signaling corresponding to a type of a UE according to the type of the UE. The PDCCH signaling carries random access response control information for the UE. Different types of UEs correspond to different PDCCH signalings, and the random access response control information is configured to indicate scheduling information associated with a random access response.

In some embodiments, search spaces of the different PDCCH signalings corresponding to the different types of UEs belong to different control resource sets (CORESETs).

In some embodiments, search spaces of the different PDCCH signalings corresponding to the different types of UEs are different.

In some embodiments, the first sending module 110 includes a first sending submodule 111 configured to send the PDCCH signaling on a candidate control channel element (CCE) resource determined according to a resource determination rule.

The resource determination rules corresponding to the different types of UEs are different.

In some embodiments, rule parameters of the resource determination rules corresponding to the different types of UEs are different.

The rule parameters include offset parameters and/or random parameters.

In some embodiments, aggregation levels of PDCCH resources of the different PDCCH signalings corresponding to the different types of UEs are different; and/or the number of candidate transmission positions of the PDCCH resources of the different PDCCH signalings corresponding to the different types of UEs is different; and/or candidate repeated transmission positions of the different PDCCH signalings corresponding to the different types of UEs are different.

In some embodiments, the first sending module 110 includes a second sending submodule 112 configured to send the PDCCH signaling within a random access response window corresponding to the type of the UE.

The random access response windows corresponding to the different types of UEs are different.

In some embodiments, time intervals between the random access response windows corresponding to the different types of UEs and random access preambles are different; and/or durations of the random access response windows corresponding to the different types of UEs are different.

In some embodiments, scrambling sequences of the different PDCCH signalings corresponding to the different types of UEs are different.

In some embodiments, the scrambling sequences are random access radio network temporary identifiers (RA-RNTIs), wherein the RA-RNTIs of the different types of UEs are different.

In some embodiments, PDSCH resources corresponding to the different types of UEs scheduled by the random access response control information are different, and the PDSCH resources are configured to transmit the random access response.

In some embodiments, the information transmission apparatus further includes a second sending module 120 configured to carry random access response control information of a first type of UE with a PDCCH signaling corresponding to a second type of UE in response to a bandwidth of an initial broadband part (BWP) of the first type of UE being equal to a bandwidth of CORESET #0.

In some embodiments, the information transmission apparatus further includes a third sending module 130 configured to send a configuration signaling. The configuration signaling is configured to indicate that random access response control information of a first type of UE is carried by a PDCCH signaling corresponding to the first type of UE or by a PDCCH signaling corresponding to a second type of UE.

In some embodiments, the information transmission apparatus further includes a first receiving module 140 configured to receive a random access preamble sent by the UE; and a first determining module 150 configured to determine the type of the UE according to type indication information carried in the random access preamble.

Embodiments of the present disclosure also provides an information transmission apparatus applied to a UE. FIG. 8 is a block diagram illustrating an information transmission apparatus 200 according to an illustrative embodiment. The information transmission apparatus 200 includes a second receiving module 210.

The second receiving module 210 is configured to receive a physical downlink control channel (PDCCH) signaling with receiving parameters corresponding to a type of the UE. The PDCCH signaling carries random access response control information of the UE. Different types of UEs correspond to different PDCCH signalings, and the random access response control information is configured to indicate scheduling information associated with a random access response.

In some embodiments, the receiving parameters include control resource set (CORESET) parameters.

The second receiving module 210 includes a first receiving submodule 211 configured to receive the PDCCH signaling on the CORESET of a search space of the PDCCH signaling corresponding to the type of the UE. The search spaces of the different PDCCH signalings corresponding to the different types of UEs belong to different CORESETs.

In some embodiments, the receiving parameters include resource parameters.

The second receiving module 210 includes a second receiving submodule 212 configured to receive the PDCCH signaling in a search space of the PDCCH signaling corresponding to the type of the UE with the resource parameter corresponding to the type of the UE. Search spaces of the different PDCCH signalings corresponding to the different types of UEs are different.

In some embodiments, the resource parameters include rule parameters of a resource determination rule.

The second receiving module 210 includes a third receiving submodule 213 configured to receive the PDCCH signaling on a candidate control channel element (CCE) resource determined according to the resource determination rule of the PDCCH signaling corresponding to the type of the UE.

The resource determination rules corresponding to the different types of UEs are different.

In some embodiments, rule parameters of the resource determination rules corresponding to the different types of UEs are different.

The rule parameters include offset parameters and/or random parameters.

In some embodiments, the resource parameters include at least one of aggregation levels of PDCCH resources of the different PDCCH signalings; and/or the number of candidate transmission positions of the PDCCH resources of the different PDCCH signalings; and/or candidate repeated transmission positions of the different PDCCH signalings.

In some embodiments, the receiving parameters include parameters of random access response windows.

The second receiving module 210 includes a fourth receiving submodule 214 configured to receive the PDCCH signaling within the random access response window corresponding to the type of the UE.

The random access response windows corresponding to the different types of UEs are different.

In some embodiments, time intervals between the random access response windows corresponding to the different types of UEs and random access preambles are different; and/or durations of the random access response windows corresponding to the different types of UEs are different.

In some embodiments, the second receiving module 210 includes a fifth receiving submodule 215 configured to descramble the PDCCH signaling with a descrambling sequence corresponding to the type of the UE. The descrambling sequences of the different PDCCH signalings corresponding to the different types of UEs are different.

In some embodiments, the scrambling sequences are random access radio network temporary identifiers (RA-RNTIs), wherein the RA-RNTIs of the different types of UEs are different.

In some embodiments, the information transmission apparatus 200 further includes a third receiving module 220 configured to receive the random access response with a PDSCH resource scheduled by the random access response control information.

The PDSCH resources corresponding to the different types of UEs are different.

In some embodiments, the information transmission apparatus 200 further includes a fourth receiving module 230 configured to receive resource instruction information of a first type of UE that is carried by a PDCCH signaling corresponding to a second type of UE and sent by a base station in response to a bandwidth of an initial broadband part (BWP) of the first type of UE being equal to a bandwidth of CORESET #0 in case that the UE is the first type of UE.

In some embodiments, the information transmission apparatus 200 further includes a fifth receiving module 240 configured to receive a configuration signaling, and receiving the random access response control information with the PDCCH signaling indicated by the configuration signaling.

In some embodiments, the information transmission apparatus 200 further includes a sending module 250 configured to send a random access preamble to a base station. The random access preamble carries type indication information indicating the type of the UE.

In an illustrative embodiment, the first sending module 110, the second sending module 120, the third sending module 130, the first receiving module 140, the first determining module 150, the second receiving module 210, the third receiving module 220, the fourth receiving module 230, the fifth receiving module 240, the sending module 250 and the like may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements, and may also be implemented in combination with one or more radio frequency (RF) antennas, for performing the above-mentioned method.

Figure 9:
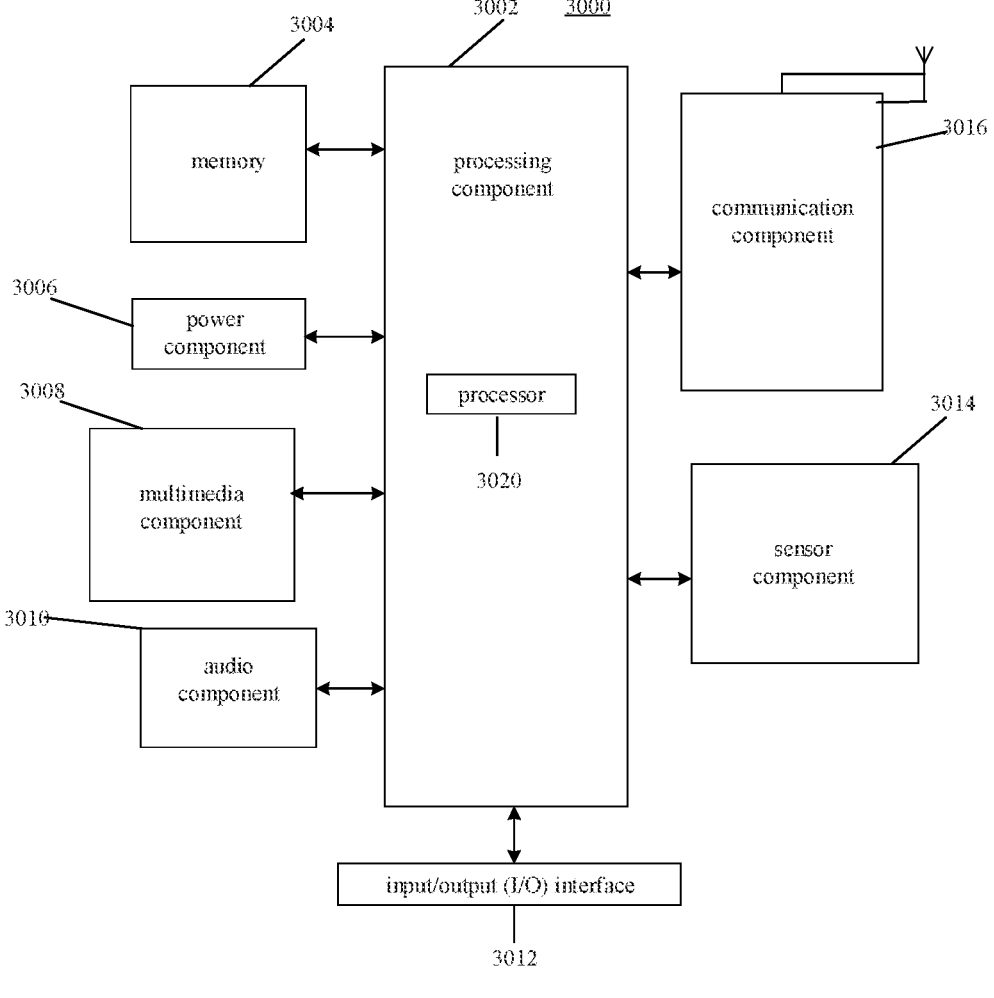
FIG. 9 is a block diagram illustrating a device for information transmission according to an illustrative embodiment.

FIG. 9 is a block diagram illustrating a device 3000 for information transmission according to an illustrative embodiment. For example, the device 3000 may be a mobile phone, a computer, a digital broadcast terminal, a messaging device, a game console, a tablet device, a medical device, a fitness device, a personal digital assistant, or the like.

As shown in FIG. 9, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or some of the steps in the above-described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, videos, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and/or the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as keyboards, click wheels, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wireless, between the device 3000 and other devices. The device 3000 can access a wireless network based on a communication standard, such as WiFi, 2G, or 3G, or a combination thereof. In one illustrative embodiment, the communication component 3016 receives a broadcast signal or broadcast associated information from an external broadcast management system via a broadcast channel. In one illustrative embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In illustrative embodiments, there is also provided a non-transitory computer-readable storage medium including instructions, such as included in the memory 3004, executable by the processor 3020 in the device 3000, for performing the above-described methods. For example, the non-transitory computer-readable storage medium may be a ROM, a RAM, a CD-ROM, a magnetic tape, a floppy disc, an optical data storage device, and the like.

In the information transmission method, the information transmission apparatus, the communication device, and the storage medium provided by embodiments of the present disclosure, the base station sends the physical downlink control channel (PDCCH) signaling corresponding to the type of the UE according to the type of the UE. The PDCCH signaling carries random access response control information for the UE. Different types of UEs correspond to different PDCCH signalings, and the random access response control information is configured to indicate scheduling information associated with a random access response. In this way, the PDCCH signaling corresponding to the type of the UE is used to carry the random access response control information corresponding to the type of the UE. On the one hand, the PDCCH signaling corresponding to the type of the UE is used to carry the random access response control information to meet different transmission requirements of different types of UEs, which improves the communication efficiency. On the other hand, different types of PDCCH signalings may meet the transmission requirements of random access response control information of different types of UEs, which reduces the coupling between random access response control information of different types of UEs, and improves the transmission flexibility of the random access response control information.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from embodiments of the present disclosure as come within known or customary practice in the art. In addition, for those skilled in the art, without departing from the principle of the present disclosure, the steps or modules in various embodiments of the present disclosure may also be replaced or combined, and these replacements and combinations could also be regarded as the protection scope of the present disclosure. It is intended that the specification and the examples be considered as illustrative only, with a true scope and spirit of the embodiments of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of embodiments of the present disclosure only be limited by the appended claims.

What is claimed is:

1. An information transmission method, applied to a base station, comprising:

receiving a random access preamble sent by a user equipment (UE);

determining a type of the UE according to type indication information carried in the random access preamble; and sending a physical downlink control channel (PDCCH) signaling corresponding to the type of the UE according to the type of the UE;

wherein the PDCCH signaling carries random access response control information for the UE; and wherein different types of UEs correspond to different PDCCH signaling, and the random access response control information is configured to indicate scheduling information associated with a random access response.

2. The method according to claim 1, wherein search spaces of the different PDCCH signaling corresponding to the different types of UEs belong to different control resource sets (CORESETs).

3. The method according to claim 1, wherein sending the PDCCH signaling corresponding to the type of the UE comprises:

sending the PDCCH signaling on a candidate control channel element (CCE) resource determined according to a resource determination rule;

wherein resource determination rules corresponding to the different types of UEs are different.

4. The method according to claim 3, wherein rule parameters of the resource determination rules corresponding to the different types of UEs are different; and the rule parameters comprise at least one of offset parameters or random parameters.

5. The method according to claim 1, wherein aggregation levels of PDCCH resources of the different PDCCH signaling corresponding to the different types of UEs are different; and/or numbers of candidate transmission positions of the PDCCH resources of the different PDCCH signaling corresponding to the different types of UEs are different; and/or candidate repeated transmission positions of the different PDCCH signaling corresponding to the different types of UEs are different.

6. The method according to claim 1, wherein sending the PDCCH signaling corresponding to the type of the UE comprises:

sending the PDCCH signaling within a random access response window corresponding to the type of the UE;

wherein random access response windows corresponding to the different types of UEs are different.

7. The method according to claim 6, wherein time intervals between the random access response windows corresponding to the different types of UEs and random access preambles are different; and/or durations of the random access response windows corresponding to the different types of UEs are different.

8. The method according to claim 1, wherein scrambling sequences of the different PDCCH signaling corresponding to the different types of UEs are different.

9. The method according to claim 8, wherein a scrambling sequence is a random access radio network temporary identifier (RA-RNTI), wherein RA-RNTIs of the different types of UEs are different.

10. The method according to claim 1, wherein physical downlink shared channel (PDSCH) resources corresponding to the different types of UEs scheduled by the random access response control information are different; and the PDSCH resources are configured to transmit the random access response.

11. The method according to claim 1, further comprising:

carrying random access response control information of a first type of UE with a PDCCH signaling corresponding to a second type of UE in response to a bandwidth of an initial broadband part (BWP) of the first type of UE being equal to a bandwidth of CORESET #0.

12. The method according to claim 1, further comprising:

sending a configuration signaling;

wherein the configuration signaling is configured to indicate that random access response control information of a first type of UE is carried by a PDCCH signaling corresponding to the first type of UE or by a PDCCH signaling corresponding to a second type of UE.

13. The method according to claim 1, wherein search spaces of the different PDCCH signaling corresponding to the different types of UEs are different.

14. An information transmission method, applied to a user equipment (UE), comprising:

sending a random access preamble to a base station;

wherein the random access preamble carries type indication information indicating a type of the UE, and receiving a physical downlink control channel (PDCCH) signaling with receiving parameters corresponding to the type of the UE;

wherein the PDCCH signaling carries random access response control information of the UE;

wherein different types of UEs correspond to different PDCCH signaling, and the random access response control information is configured to indicate scheduling information associated with a random access response; and wherein the receiving parameters comprise resource parameters.

15. The method according to claim 14, wherein the receiving parameters comprise control resource set (CORESET) parameters;

receiving the PDCCH signaling with the receiving parameters corresponding to the type of the UE comprises:

receiving the PDCCH signaling on a CORESET of a search space of the PDCCH signaling corresponding to the type of the UE;

wherein search spaces of the different PDCCH signaling corresponding to the different types of UEs belong to different CORESETs.

16. The method according to claim 14, wherein the resource parameters comprise rule parameters of a resource determination rule; and receiving the PDCCH signaling with the receiving parameters corresponding to the type of the UE comprises:

receiving the PDCCH signaling on a candidate control channel element (CCE) resource determined according to the resource determination rule of the PDCCH signaling corresponding to the type of the UE;

wherein resource determination rules corresponding to the different types of UEs are different.

17. The method according to claim 16, wherein rule parameters of the resource determination rules corresponding to the different types of UEs are different; and the rule parameters comprise at least one of offset parameters or random parameters.

18. A communication device, comprising:

a processor;

a transceiver; and a memory storing a program executable by the processor;

wherein the processor is configured to:

receive a random access preamble sent by a user equipment (UE);

determine a type of the UE according to type indication information carried in the random access preamble; and send a physical downlink control channel (PDCCH) signaling corresponding to the type of the UE according to the type of the UE;

wherein the PDCCH signaling carries random access response control information for the UE; and wherein different types of UEs correspond to different PDCCH signaling, and the random access response control information is configured to indicate scheduling information associated with a random access response.

* * * * *